United States Patent Office 3,590,069
Patented June 29, 1971

3,590,069
METHOD FOR THE PREPARATION OF 2-METHYLENEGLUTARONITRILE
Joseph W. Nemec, Rydal, and Richard B. Wuchter, Jenkintown, Pa., assignors to Rohm & Haas Company, Philadelphia, Pa.
No Drawing. Filed Feb. 1, 1966, Ser. No. 523,966
Int. Cl. C07c 12/30
U.S. Cl. 260—465.8
8 Claims

ABSTRACT OF THE DISCLOSURE

A method for preparing 2-methyleneglutaronitrile by dimerizing acrylonitrile in the presence of a catalyst defined by the formula $$(R'R''N)_3P$$

or $$(R'R''N)_2PR'''$$

wherein the symbols R' and R'' may be the same or different within any one compound.

R' and R'' represent alkyl groups of 1 to 18 carbon atoms joined to the nitrogen atom at a primary carbon atom.

R' and R'', collectively with the nitrogen atom to which they are attached, may form a saturated cyclic amine group containing up to 5 carbon atoms in the ring, optionally containing 1 or more alkyl substituents having a total of up to 6 carbon atoms.

---

This invention deals with a method for the preparation of 2-methyleneglutaronitrile having the formula $$NC\overset{\overset{CH_2}{\|}}{C}CH_2CH_2CN$$

This compound is prepared by dimerizing acrylonitrile.

The present invention deals with a method for preparing 2-methyleneglutaronitrile from acrylonitrile employing as a catalyst a compound defined by the formula $$(R'R''N)_3P$$

or $$(R'R''N)_2PR'''$$

wherein the symbols R' and R'' may be the same or different within any one compound.

R' and R'' represent alkyl groups of 1 to 18 carbon atoms joined to the nitrogen atom at a primary carbon atom. It is perferred that these groups contain from 1 to 4 carbon atoms. Neither R' nor R'' can be hydrogen or aryl.

R' and R'', collectively with the nitrogen atom to which they are attached, may form a saturated cyclic amine group containing up to 5 carbon atoms in the ring, optionally containing 1 or more alkyl substituents having a total of up to 6 carbon atoms. This cyclic amine group may contain an oxygen atom or a sulfur atom, if desired.

R''' represents alkyl groups of 1 to 18 carbon atoms, preferably 1 to 4 carbon atoms, phenyl or alkyl-substituted phenyl in which the alkyl substituent may be represented by one or more alkyl groups in which the total carbon content of the alkyl substitution ranges from 1 to 8 carbon atoms. R''' may also be cycloalkyl.

Typically, R' and R'', individually, may be methyl, ethyl, propyl, butyl, pentyl, hexyl, octyl, dodecyl, octadecyl and, collectively with the nitrogen atom, may represent piperidino, morpholino, trimorpholino, piperazino, pyrrolidinyl and ethylpiperidino.

Typically, R''' may represent methyl, ethyl, propyl, butyl, pentyl, cyclopentyl, hexyl, cyclohexyl, octyl, dodecyl, octadecyl, phenyl, tolyl, xylyl, diethylphenyl and dibutylphenyl.

Specific embodiments of the catalyst typically include hexa-n-propylphosphorus triamide, hexaethylphosphorus triamide, hexa-n-butylphosphorus triamide, dimethyltetra-n-propylphosphorus triamide, tripiperidinophosphorus triamide, hexa-n-octylphosphorus triamide, hexamethylphosphorus triamide, N,N,N',N'-tetramethyl-P-phenylphosphonous diamide, N,N,N',N'-tetra-n-butyl-P-phenylphosphonous diamide, N,N-dimethyl-N',N'-dioctyl-P-phenylphocsphonous diamide, N,N,N',N'-tetra-n-butyl-P-ethylphenylphosphonous diamide, N,N,N',N'-tetramethyl-P-tolylphosphonous diamide, N,N-diethyl-N',N'-di-n-butyl-P-octylphenylphosphonous diamide, phenyldipiperidyl phosphine and tolyldimorpholino phosphine. Preferred embodiments are hexa-n-propylphosphorus triamide and hexa-n-butylphosphorus triamide.

The specific catalyst, as defined above, is employed in the present process in amounts as low as about 0.25 mole percent and as high as about 4.0 mole percent. Preferably, there is employed about 1.0 to 2.0 mole percent. When amounts less than 0.25 mole percent of catalyst are employed, the conversion diminishes significantly and in amounts higher than 4.0 mole percent, higher polymer formation increases.

The catalyst may be employed as such or prepared in situ, as desired. If preparation in situ is contemplated, one employs phosphorus trichloride or a substituted phosphorus dichloride and the appropriate amine, as will be understood by those skilled in the art. The in situ preparation involves the formation of an amine salt which must be substantially completely removed, such as by filtration or washing, as desired.

The present process is conducted in the range of about 25° to 150° C., preferably 85° to 100° C. The pressure is not critical and the reaction is generally performed at atmospheric pressure, although superatmospheric pressures are suitable. If desired, nitrogen or other inert atmosphere may be used, but such is not required.

The reaction is preferably run using dilute solutions in order to minimize the formation of higher polymers. It is preferable to employ a solvent, preferably an inert, volatile, organic solvent, such as toluene, dioxane, acetonitrile and the like.

One may conduct the present reaction by adding the catalyst slowly to the acrylonitrile. It is possible to reverse this procedure but results are not as favorable. It is desirable to add the catalyst incrementally to maintain a low ratio of catalyst to acrylonitrile in order to minimize anionic polymerization of the acrylonitrile.

For highest yields and best results, it is preferred to employ a free-radical inhibitor for acrylonitrile in the reaction medium. Satisfactory for this purpose is hydroquinone and the like.

At the conclusion of the reaction, the desired product is separated by distillation techniques. Typically, unreacted material, if any, and the solvent, if one is employed, are removed first, thereby isolating the product. If desired, the dimer product can be distilled for purposes of purification and is then available for a wide range of known uses, such as in resins and fibers. For instance, fibers modified with 2-methyleneglutaronitrile may be melt spun, as well as solution spun, and thereby commercially compete with fibers made of nylon, olefins and polyesters. Also, 2-methyleneglutaronitrile can be completely hydrogenated to form 2-methylpentamethylenediamine, which gives lower softening, more soluble nylons than corresponding polymers from hexamethylenediamine.

By adhering strictly to the aforementioned conditions, one is able to produce consistently and economically high yields of desired product without any appreciable, undesirable side effects.

The present process may be more fully understood from the following examples that are offered by way of illustration and not by way of limitation.

EXAMPLE 1

Phosphorus trichloride, 1.67 grams (12.1 millimoles), is added slowly to a solution containing 7.43 grams (73.5 mmoles) of di-n-propylamine dissolved in 18 ml. of toluene at 0° C. After the addition, the reaction is stirred at room temperature for 1 hour. The resulting solution is washed twice with a total of 40 mls. of water. This catalyst solution is then added over 2½ hours to a refluxing solution containing 64.0 grams (1.21 moles) of acrylonitrile, 4.0 grams of hydroquinone and 300 grams of dioxane. The reaction is stirred an additional hour at reflux. Isolation by conventional procedures produces 34.2 grams of recovered acrylonitrile and 29.4 grams of 2-methyleneglutaronitrile, boiling point 75° to 80° C. at 0.15 mm., $n_D^{25}$ of 1.4555, molecular weight of 110. The infrared and proton magnetic resonance spectra substantiate the structure for the dimer.

Similar results are obtained by using tripiperidinophosphorus triamide as the catalyst.

EXAMPLE 2

Acrylonitrile, 64 grams, and 4.0 grams of hydroquinone dissolved in 240 ml. of dioxane are added over 1 hour to a refluxing catalyst solution prepared exactly as in Example 1. The reaction is maintained for 2 hours. There is recovered 29.6 grams of acrylonitrile and 15.9 grams of 2-methyleneglutaronitrile is produced.

Similar results are obtained by employing hexa-n-octylphosphorus triamide as the catalyst.

EXAMPLE 3

The procedure of Example 1 is followed except that twice the quantity of catalyst is employed. From 64 grams of acrylonitrile, 26.2 grams of 2-methyleneglutaronitrile is produced and 30.9 grams of acrylonitrile is recovered.

EXAMPLE 4

A solution containing 4.0 grams (12.1 mmole) of hexa-n-propylphosphorus triamide, dissolved in 60 grams of toluene, is added over a 3-hour period to a refluxing solution, under nitrogen, containing 64 grams of acrylonitrile, 4.0 grams of methylether of hydroquinone and 240 grams of toluene. After 3 hours of reaction, 20.3 grams of acrylonitrile is recovered and 23.1 grams of 2-methyleneglutaronitrile is produced.

Similar results are obtained by using dimethyltetra-n-propylphosphorus triamide as the catalyst.

EXAMPLE 5

Under an atmosphere of nitrogen, 4.0 grams of hexa-n-propylphosphorus triamide, dissolved in 16 grams of dibutyl phthalate, is added over a 3-hour period to a solution, at 95° C., containing 64 grams of acrylonitrile, 2 grams of water, 4 grams of hydroquinone and 300 grams of dibutyl phthalate. The reaction is maintained for an additional 3½ hours. Acrylonitrile 22.9 grams is recovered, and 23.0 grams of 2-methyleneglutaronitrile are produced.

EXAMPLE 6

Hexa-n-propylphosphorus triamide, 4.0 grams, dissolved in 80 ml. of dioxane, is added over 20 minutes to a mildly refluxing solution containing 64 grams of acrylonitrile, 4 grams of hydroquinone and 240 ml. of dioxane—the entire operation being performed under nitrogen. After maintaining for 1 hour, 26.6 grams of acrylonitrile is recovered and 15.2 grams of 2-methyleneglutaronitrile is obtained on distillation.

In a similar way, there is employed phenyldimorpholino phosphine or octyldipyrrolidinyl phosphine as the catalyst.

EXAMPLE 7

A solution containing 64 grams of acrylonitrile, 4.0 grams of hydroquinone and 300 grams of toluene is added over 2½ hours to a refluxing solution containing 3.33 grams of phenyldipiperidylphosphine dissolved in 80 grams of toluene. The reaction is refluxed for 1 hour after the addition, and the entire reaction is performed under nitrogen. There is recovered 34.4 grams of acrylonitrile and 11.3 grams of 2-methyleneglutaronitrile is produced.

In a similar way, there is employed as catalyst N,N,N',N'-tetramethyl-P-butylphosphonous diamide.

What is claimed is:

1. In a method for the preparation of 2-methyleneglutaronitrile which comprises dimerizing acrylonitrile in the presence of a catalyst, the improvement of using as the catalyst a compound having the formula $$(R'R''N)_3P$$

or $$(R'R''N)_2PR'''$$

in which
R' represents alkyl of 1 to 18 carbon atoms joined to the nitrogen at a primary carbon atom,
R'' represents alkyl of 1 to 18 carbon atoms joined to the nitrogen at a primary carbon atom,
R''' is alkyl of 1 to 18 carbon atoms, a cycloalkyl, phenyl or alkyl-substituted phenyl, in which the alkyl substitution ranges from 1 to 8 carbon atoms and
R' and R'', collectively with the nitrogen atom to which they are attached, form a saturated cyclic amine radical selected from the group consisting of piperidino, morpholino, thiomorpholino, piperazino, pyrrolidinyl and ethylpiperidino.

2. A method according to claim 1 wherein said catalyst is used in the range of about 0.25 to 4.0 mole percent and the reaction is conducted in the range of about 25° to 150° C.

3. A method according to claim 1 wherein said catalyst is used in the range of about 1.0 to 2.0 mole percent and the reaction is conducted in the range of about 85° to 100° C.

4. A method according to claim 1 wherein R' and R'' are propyl.

5. A method according to claim 1 wherein R' and R'' are butyl.

6. A method according to claim 2 wherein said catalyst is prepared in situ and the reaction is conducted in the presence of an inert, volatile, organic solvent.

7. A method according to claim 6 wherein the solvent is dioxane.

8. A method according to claim 1 wherein said catalyst is selected from the group consisting of hexamethylphosphorus triamide, hexaethylphosphorus triamide, hexa-n-propylphosphorus triamide and hexa-n-butylphosphorus triamide.

References Cited

UNITED STATES PATENTS 3,342,853  9/1967  Nemec et al. _____ 260—485
3,342,854  9/1967  Nemec et al. _____ 260—485

FOREIGN PATENTS 1,366,081  6/1964  France _____ 260—465.8
1,385,883  12/1964  France _____ 260—465.8

JOSEPH PAUL BRUST, Primary Examiner